United States Patent [19]

Aonuma et al.

[11] 4,020,236

[45] Apr. 26, 1977

[54] PROCESS FOR PRODUCING A MAGNETIC MATERIAL AND MAGNETIC RECORDING MEDIUM CONTAINING THE SAME

[75] Inventors: Masashi Aonuma; Yasuo Tamai, both of Odawara, Japan

[73] Assignee: Fuji Photo Film Co., Ltd., Minami-ashigara, Japan

[22] Filed: July 22, 1975

[21] Appl. No.: 598,098

[52] U.S. Cl. .............................. 428/457; 75/.5 AA; 148/105; 427/127; 252/62.54; 340/174 NA; 428/539; 428/900

[51] Int. Cl.² ..................... H01F 1/02; C04B 35/04

[58] Field of Search ......... 148/105; 75/.5 AA, 108; 427/127, 128, 129, 132; 428/432, 433, 457, 539, 900; 252/62.54; 340/174 NA

[56] References Cited

UNITED STATES PATENTS

| | | | |
|---|---|---|---|
| 2,734,821 | 2/1956 | Schaufelberger | 75/108 |
| 3,206,338 | 9/1965 | Miller et al. | 148/105 |
| 3,669,643 | 6/1972 | Bagley et al. | 75/.5 AA |
| 3,756,866 | 9/1973 | Parker et al. | 75/.5 AA |
| 3,902,888 | 9/1975 | Aonuma et al. | 75/.5 AA |

*Primary Examiner*—Walter R. Satterfield
*Attorney, Agent, or Firm*—Sughrue, Rothwell, Mion, Zinn & Macpeak

[57] ABSTRACT

A ferromagnetic material having a high coercive force and good squareness ratio prepared by mixing an aqueous solution at least containing a salt of a metal capable of forming a ferromagnetic material with a solution of a reducing agent containing at least one of a boron hydride compound or a derivative thereof to perform an oxidation-reduction reaction, wherein the mixing of the solutions is after adjusting the pH of the aqueous solution of the metal salt to about 3.0 or less, and the pH of the reaction mixture at the end of the reaction is adjusted to at least about 3.0 or higher.

16 Claims, No Drawings

PROCESS FOR PRODUCING A MAGNETIC MATERIAL AND MAGNETIC RECORDING MEDIUM CONTAINING THE SAME

BACKGROUND OF THE INVENTION

1. Field of the Invention

This invention relates to the production of a magnetic material, and more specifically, to a process for producing a magnetic material for use in a magnetic recording medium suitable for high density recording.

2. Description of the Prior Art

According to the prior art, $\gamma\text{-Fe}_2\text{O}_3$, Co-containing $\gamma\text{-Fe}_2\text{O}_3$, $\text{Fe}_3\text{O}_4$, Co-containing $\text{Fe}_3\text{O}_4$, and $\text{CrO}_2$ have been used as ferromagnetic powders for use in magnetic recording media. However, these ferromagnetic powders are not suitable for magnetic recording of signals of short wavelengths, e.g., wavelengths less than about 2 microns), and thus, have magnetic characteristics such as coercive force (Hc) and residual magnetic flux density (Br) which are insufficient for use in high density recording. In recent years, a number of various attempts to develop ferromagnetic powders having characteristics suitable for high density recording have been made. One material which has been investigated is a ferromagnetic metal powder, mainly of iron, cobalt or nickel with or without chromium, manganese, zinc, or rare earth elements.

Various methods are known for producing powdery metallic ferromagnetic materials. For example, the following six methods are known.

1. The reduction of an oxalate salt of a metal capable of forming a ferromagnetic material, at high temperatures in a stream of hydrogen (as disclosed, for example, in Japanese Patent Publications Nos. 11412/61, 22230/61, 14809/63, 8027/65, 14818/66, 22394/68, 38417/72 and 292280/73, and The Record of Electrical and Communication Engineering Conversazione Tohoku University, Vol. 33, No. 2, page 57, published 1964).

2. The reduction of needle-like oxyhydroxides with or without other metals or needle-like iron oxide obtained therefrom (as disclosed, for example, in Japanese Pat. Publications Nos. 3862/60, 20939/64 and 39477/72, Japanese Pat. application (OPI) No. 7153/71, German Pat. application OLS No. 2,130,921, British Pat. No. 1,192,167, and U.S. Pat. No. 3,681,018).

3. The vaporization of ferromagnetic metals in inert gases (as disclosed, for example, in Japanese Pat. Publication No. 27718/72, Japanese Pat. applications (OPI) Nos. 25662/73, 25663/73, 25664/73, 25665/73, and 55400/73, and Ohyo Butsuri (Applied Physics), Vol. 40, No. 1, page 110, (1971)).

4. The decomposition of metal carbonyl compounds (as disclosed, for example, in Japanese Pat. Publications Nos. 128/63 and 3415/65, and U.S. Pat. Nos. 2,983,997, 3,172,776, 3,200,007 and 3,228,882).

5. The electrodeposition of ferromagnetic metals in mercury using a mercury cathode, followed by separating the metals from the mercury by heating (as disclosed, for example, in Japanese Pat. Publications Nos. 787/64, 15525/64, and 8123/65 and U.S. Pat. No. 3,156,650).

6. The reduction of salts of metals capable of forming ferromagnetic materials in aqueous solutions thereof with a reducing substance (e.g., boron hydride compounds, hypophosphorous acid salts, or hydrazines) to form ferromagnetic powders (as disclosed, for example, in Japanese Pat. Publications Nos. 20520/63, 26555/63, 4567/66, 4769/66, 4769/66, 20116/68, 16052/72, 41718/72 and 4719/72, Japanese Pat. application (OPI) Nos. 1353/72 and 79754/73, U.S. Pat. Nos. 3,663,318, 3,661,556, 3,661,556, 3,494,760, 3,206,338, 3,567,525, 3,535,104, 3,607,218, 3,669,643, 3,672,867 and 3,756,866, and German Pat. application OLS No. 2,132,430).

The present invention pertains to the method for reducing salts of ferromagnetic metals in solutions thereof described in paragraph (6) above, in which a boron hydride compound or a derivative thereof is used as the reducing agent.

The conventional method for preparing ferromagnetic powders by mixing an aqueous solution of a salt of a ferromagnetic metal with a reducing agent containing a boron hydride compound or a derivative thereof presents the following problems.

1. The coercive force of the ferromagnetic powder formed can be adjusted within the range of about 10 to 2,000 Oe. The method, however, has poor reaction efficiency when it is desired to obtain powders having a high coercive force of at least 1,000 Oe, particularly 1,200 Oe or more and a good squareness ratio. The reaction must be carried out in a bath having a very low concentration, and the method is uneconomical for mass production.

2. It is difficult to obtain powders consisting mainly of Fe or Co and additives for improving the stability to oxidation, etc., such as rare earth elements, elements of group IVa, elements of group VIa, elements of group VIIa, elements of group VIII, elements of group Ib, elements of group IIb, elements of group IIIb, elements of group IVb, and elements of group Vb which have a high coercive force of more than 1,200 Oe and good squareness ratio.

On the other hand, as a magnetic material having a high coercive force of 1,000 Oe or more, iron oxides containing Co are well-known. These iron oxides, however, have the defects that the thermal demagnetization and the heat demagnetization are high and the Hc and the squareness ratio thereof are decreased at a high temperature. Furthermore, it was found that the Bm of a magnetic recording medium using an iron oxide is lower in comparison with that of a magnetic recording medium using a ferromagnetic metal alloy powder, e.g., in using as a master tape for magnetic duplication by contact print, an out-put of a slave tape duplicated using an iron oxide is lower by 4 to 6 dB than that using a ferromagnetic metal alloy.

It has now been found that the coercive force of a metal powder for a magnetic recording medium can be increased by treating the powder with an inorganic acid such as sulfuric acid, etc. However, because of a decrease in the saturation magnetization ($\sigma s$), a decrease in the oxidation resistance, and an increase in the half width of the differential curve of the hysteresis curve, it has been found that use of a metal oxide for a magnetic recording medium is disadvantageous in practice due to the decrease in Bm and in the squareness ratio (Br/Bm).

SUMMARY OF THE INVENTION

Accordingly, a first object of this invention is to provide a ferromagnetic metal powder suitable for high density recording.

A second object of this invention is to provide a ferromagnetic powder having a high residual magnetization and a high coercive force suitable for master tapes for magnetic recording.

A third object of this invention is to provide a ferromagnetic powder that can be used also for permanent magnets, magnetic cores, and magnetic fluid suspensions.

It has now been found that a magnetic powder having a high coercive force and a high residual magnetic flux density can be obtained by mixing an aqueous solution containing at least a salt of a metal capable of forming a ferromagnetic material with an aqueous solution containing a reducing substance such as a boron hydride compound to induce a chemical oxidation-reduction reaction, wherein the pH of the reaction bath is controlled.

According to this invention, a process for preparing a ferromagnetic material is provided which comprises mixing an aqueous solution containing at least a salt of a metal capable of forming a ferromagnetic material and whose pH has been adjusted to about 3.0 or less, preferably to 0.5 to 2.5, with a solution of a reducing agent containing at least one boron hydride compound or a derivative thereof to perform an oxidation-reduction reaction, and adjusting the pH of the reaction mixture at the end of the reaction to at least about 3.0 or higher.

DETAILED DESCRIPTION OF THE INVENTION

The term "salt of a metal capable of forming a ferromagnetic material," as used herein, denotes a salt containing at least one of Fe, Co, Fe-Co, Fe-Ni, Co-Ni, and Fe-Co-Ni, and if desired, a suitable amount of at least one or more salts of a rare earth element (Group IIIb) such as La, Ce, Nd and Sm, an element of Group IVb such as Ti and Zr, an element of Group VIb such as Cr, Mo and W, an element of Group VIIb such as Mn and Re, an element of Group VIIIa other than Fe, Co and Ni such as Ru, Rh, Pd, Os, Ir and Pt, an element of Group Ib such as Cu and Ag, an element of Group IIb such as Zn, an element of Group IIIa such as Al, an element of Group IVa such as Sn and Pb, and an element of Group Va such as P, As and Sb. The salts of these elements can be organic or inorganic water-soluble salts, such as sulfates, chlorides, sulfides, nitrates, formates, acetates and sulfamates. Aqueous solutions of these salts usually have a pH of at least 3.

The term "aqueous solution at least containing a salt of a metal capable of forming a ferromagnetic material," as used herein, means an aqueous solution optionally containing various additives in addition to the above-described components.

For example, a soluble protein (e.g., as disclosed in Japanese Pat. application (OPI) No. 18345/75), a carbohydrate (e.g., as disclosed in Japanese Pat. application No. (OPI) No. 19667/75), and an organic solvent can be optionally incorporated in the reaction bath.

The term aqueous solution, as used herein, denotes a solution mainly containing water, but the solution may further contain a water-miscible polar organic solvent. Suitable polar organic solvents can, for example, be completely or partially water-miscible and include alcohols or ketones, used in an amount of up to about 50% by weight based on the weight of the water. Specific examples of suitable solvents include methyl alcohol, ethyl alcohol, isopropyl alcohol, acetone, methyl ethyl ketone, dimethyl sulfoxide, dimethylformamide, tetrahydrofuran, and dioxane.

In the process of this invention the pH of the aqueous solution of containing at least a salt of a metal capable of forming a ferromagnetic (e.g., having a pH of about 3 to 5) is adjusted to not more than about 3.0, preferably to the range of about 0.5 to 2.5, by adding a pH adjusting agent. Organic acids and inorganic acids can be used as the pH adjusting agent. For example, at least one of hydrochloric acid, sulfuric acid, phosphoric acid, hypophosphorous acid, nitric acid, acetic acid, formic acid, hydrobromic acid and hydroiodic acid. Where a high coercive force is desired, hydrochloric acid and sulfuric acid are especially effective. Examination using an election microscope showed that no appreciable change in the particle size and the form of the resulting ferromagnetic powder occurred as a result of the adjustment of the pH to not more than about 3.0. It is surprising that, in spite of this, the coercive force of the magnetic powder increases.

The reducing agent used in this invention is at least one member selected from boron hydride compounds such as borane, borazane, borohydride, sodium borohydride, potassium borohydride, dimethylaminoborane, or diethylaminoborane, and the like and the derivatives thereof.

The reducing agent is dissolved in water, methanol or a like solvent, preferably water, when used, and it is preferred that hydroxide ion be present in the solution. In this case, the amount of the hydroxide ion affects the weather-resistance of the formed magnetic material. More precisely, when the concentration of the hydroxide ion is in the range of about 0.001N to 0.6N, the weather-resistance of the magnetic substance formed is high. Suitable alkaline materials which can be used to obtain this hydroxide concentration are water soluble, produce hydroxide ions in solution and are capable of generating a pH of higher than about 8. Preferred inorganic hydroxides are the hydroxides of Group I and Group II elements such as sodium hydroxide, potassium hydroxide, barium hydroxide and calcium hydroxide, and suitable examples of organic alkaline materials include n-butylamine, isopropylamine, hydrazine, etc.

The aqueous solution containing the salt of the metal capable of forming a ferromagnetic material is than mixed with the aqueous solution containing the reducing agent so that an oxidation-reduction reaction can occur.

The application of ultrasonic vibration during the reducing reaction is also an effective technique for improving the characteristics of the ferromagnetic powder. In order to increase the coercive force and the squareness ratio, it is effective to apply a magnetic field of more than about 10 Oe to the reaction bath during the reducing reaction. The magnetic field strength is preferably as high as possible, and is preferably about 500 to 3,000 Oe. When the reducing reaction is carried out using a boron hydride compound or a derivative thereof, the temperature of the reaction mixture is desirably not more than about 65° C, preferably not more than about 40° C, and the preferred reaction pressure is about 0.5 to 5 atmospheres.

Thus, it has been found that the pH of the reaction mixture at the end of the oxidation-reduction reaction needs to be at least about 3.0. If the pH is less than about 3.0, the ferromagnetic powder is again dissolved as a result of the reaction, and the yield of the magnetic powder decreases. It is frequently observed that even when washing with water is fully carried out, the saturation magnetization ($\sigma$) may sometimes decrease. By adjusting the pH of the reaction mixture at the end of the reaction to at least about 3.0, the time required for washing the reaction product with water after the reaction can be shortened, and it is possible to obtain a ferromagnetic powder having a high coercive force (Hc) and a high residual magnetic flux density (Br).

The ferromagnetic powder in accordance with this invention is prepared, for example, by mixing an aqueous solution containing at least a salt of a metal capable of forming a ferromagnetic material with a solution of a reducing agent containing a boron hydride compound, and allowing an oxidation-reducing reaction to occur preferably in a magnetic field. After the reaction, the resulting powder is separated from the mother liquor, and washed with water. Here, the surface of the powder is preferably treated with an anodic surface active agent, preferably a fatty acid salt having 11 to 18 carbon atoms, as described in Japanese Pat. application No. (OPI) No. 33758/76. Examples of fatty acid salts described above include alkali metal or alkali earth metal salts of saturated or an unsaturated fatty acids comprising an alkali metal such as Na, K, etc., an alkaline earth metal such as Mg, Ca, etc., a saturated fatty acid such as lauric acid, myristic acid, palmitic acid, stearic acid, etc., and an unsaturated fatty acid such as undecylic acid, oleic acid, elaidic acid, linolic acid, linolenic acid, etc. Then, the powder is subjected to a dehydration and subsequently dried in a non-oxidizing atmosphere or under vacuum at a temperature of 100° to 200° C. As another process, water is replaced by acetone, for example, and the powder is maintained in the acetone. Further, the acetone is evaporated to dry the magnetic powder, and it is used as a magnetic material for magnetic recording. Or acetone can further be replaced by, for example, n-butyl acetate, and the powder can be used as a magnetic material for magnetic recording without drying.

The concentration of the ferromagnetic metal ion in the aqueous solution of the salt of the metal capable of forming a ferromagnetic material is about 0.002 to 2 moles/liter, preferably 0.01 to 0.5 mole/liter.

The concentration of the other metal ions is about 0 to 15 mole%, preferably 0 to 5 mole%.

Desirably, the concentration of the boron hydride compound or the derivative thereof used as the reducing agent is about 0.0002 to 10 moles/liter, and it has been found to be especially desirable to perform the reaction while maintaining the molar ratio of the reducing agent to the metal ion at about 0.1:1 to 5:1, preferably 0.25:1 to 4:1.

When the surface of the ferromagnetic metal powder is treated with an anodic surface active agent, the concentration of the anodic surface active agent preferably ranges from about 0.001 to 0.3 mole/liter, and the amount thereof employed ranges from about 10 to 500 parts by weight, preferably about 50 to 200 parts by weight, per part by weight of the ferromagnetic metal powder.

The magnetic field employed can be either a direct current field, an alternating current field, or a pulsating current field. When the reaction is carried out in the absence of a magnetic field, the saturation characteristics of the powder become poor, and at the same time, the squareness ratio is degraded considerably. However, such a ferromagnetic powder can be used for special uses.

In the present invention, the ferromagnetic powders contain at least about 80% by weight of metals comprising at least about 80% by weight of a metal selected from Fe, Co, or Ni or a mixture thereof, i.e., Fe, Co, Ni, Fe-Co, Fe-Ni, Co-Ni, Fe-Co-Ni as main components, and the ferromagnetic powders preferably contain about 40% by weight or more of Fe. In addition, in addition to these metals described above, if desired, the ferromagnetic powders can contain an amount of about 20% by weight or less, preferably from about 0.5 to 5%, of at least one element of Group IVa, Group VIa, Group VIIa, Group VIII, Group Ib, Group IIb, Group IIIb, Group IVb and Group Vb. Metal alloy components of the ferromagnetic powders such as Fe-Co-Ti, Fe-Co-Cr, Fe-Co-Mn, Fe-Co-Ni, Fe-Co-Cu, Fe-Co-Zn, Fe-Co-Al, Fe-Co-Pb, Fe-Co-P, Fe-Co-Ni-Ti, Fe-Co-Ni-Cr, Fe-Co-Ni-Mn, Fe-Co-Ni-Cu, Fe-Co-Ni-Zn, Fe-Co-Ni-Al, Fe-Co-Ni-Pb, Fe-Co-Ni-P, Fe-Co, etc. are preferred. A particularly preferred composition of the ferromagnetic powders is about 68 to 89% by weight Fe; about 7 to 34% by weight Co, and about 0.5 to 5% by weight Cr based on the metal composition. The residue of the ferromagnetic powders contains at least one of water, hydroxides, oxides, fatty acid salts, etc. Further, a ferromagnetic powder on whose surface a mono or di-molecular layer of an anodic surface active agent is particularly preferred.

The ferromagnetic powders obtained in accordance with this invention have a coercive force of about 1,000 to 2,500 Oe, and a saturation magnetization ($\sigma s$) of at least about 75 emu/g. In the course of the reaction, boron (B) enters the ferromagnetic metal powder in an amount of about 0.1 to 10% by weight, preferably about 0.5 to 10% by weight. Furthermore, it is possible for the ferromagnetic metal powder, either wholly or partly, to be in the form of an oxide or hydroxide. Preferably, the pH of the aqueous solution containing a reducing agent is at least about 8.

Some of the effects and advantages of this invention are as follows:

1. A ferromagnetic powder having a high coercive force and residual magnetic flux density can be obtained using a simple method.

2. The efficiency of the reaction can be increased.

3. A magnetic powder which is oxidation resistance and also which has a high coercive force and residual magnetic flux density can be provided.

The size of the individual particles of the ferromagnetic powder of this invention is about 50 to 1000 Å. It was observed that several particles to nearly 100 such particles assume a thread-like, rod-like or necklace-like form.

The effect of the present invention can be increased by heating the ferromagnetic powder in a non-oxidizing atmosphere such as an atmosphere of helium, argon, nitrogen, carbon monoxide, carbon dioxide, hydrogen, etc. or in the presence of a small amount of $H_2O$ or $O_2$, e.g., 10 volume % or less of water vapor or oxygen.

The ferromagnetic powder of this invention can be dispersed in a binder, and coated on a support, followed by drying to form a magnetic recording medium such as a tape, a disc, a card, a drum, etc.

Binders which can be used together with the ferromagnetic powder materials of the present invention include conventional thermplastic resins, thermosetting resins and mixtures thereof. These resins can be used individually or in the form of a mixture thereof.

Useful thermoplastic resins have a softening point of lower than about 150° C, a mean molecular weight of about 10,000 to 200,000 and a degree of polymerization of about 200 to 2,000, and include the following polymers; vinyl chloride-vinyl acetate copolymers, vinyl chloride-vinylidene chloride copolymers, vinyl chloride-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, polyvinyl fluoride resins, vinylidene chloride-acrylonitrile copolymers, butadiene-acrylonitrile copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, chlorovinyl etheracrylic ester copolymers, amino resins, various synthetic rubber resins and mixtures thereof.

These thermoplastic binder resins are described in Japanese Pat. Publication Nos. 6877/62, 12528/64, 19282/64, 5349/65, 20907/65, 9463/66, 14059/66, 66985/66, 6428/67, 11621/67, 4623/68, 15206/68, 2889/69, 17947/69, 18232/69, 14020/70, 14500/70, 18573/72, 22068/72, 22069/72, 22070/72, and 27886/72, and U.S. Pat. Nos. 3,144,352, 3,419,420, 3,499,789 and 3,713,887.

Useful thermosetting resins have a molecular weight of less than about 200,000 as a coating solution, but the molecular weight becomes infinity due to the condensation and addition reactions occurring on heating the coating solution. Such resins are preferably not softened or melted before they thermally decompose. Examples of thermosetting resins are phenol resins, epoxy resins, polyurethane hardening resins, urea resins, melamine resins, alkyd resins, silicone resins, acrylic reactive resins, epoxy-polyamide resins, nitrocellulose-melamine resins, a mixture of a high molecular weight polyester resin and an isocyanate prepolymer, a mixture of a methacrylic copolymer and a diisocyanate prepolymer, a mixture of a polyesterpolyol and a polyisocyanate, urea-formaldehyde resins, a mixture of a low molecular weight glycol, a high molecular weight diol and triphenylmethanetriisocyanate, polyamine resins and mixtures thereof.

These resins are described in Japanese Pat. Publication Nos. 8103/64, 9779/65, 7192/66, 8106/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72, and U.S. Pat. Nos. 3,144,353, 3,320,090, 3,437,510, 3,597,273, 3,781,210, and 3,781,211.

The binder can be used individually or as mixtures thereof. Other ingredients, such as dispersing agents, lubricants, abrasive agents and anti-static agents, can be added to the binder. The weight ratio of the ferromagnetic powder to the binder can suitanly range from about 100:10 to 100:200.

Useful dispersing agents which can be employed include, for example, fatty acids represented by the formula $R_1COOH$ (where $R_1$ is an alkyl or alkenyl group having 11 to 17 carbon atoms), e.g., caprylic acid, capric acid, lauric acid, myristic acid, palmitic acid, stearic acid, oleic acid, elaidic acid, linolic acid, linolenic acid, stearolic acid, etc., alkali metal (Li, Na, K, etc.) or alkaline earth metal (Mg, Cs, Ba, etc.) salts of these fatty acids, and lecithin. Higher alcohols having more than 12 carbon atoms and the sulfuric esters thereof can be used.

Such a dispersing agent is employed in the binder in a weight ratio of the dispersing agent to the binder of about 0.5:100 to 20:100. Suitable dispersing agents are described in Japanese Pat. Publication Nos. 28369/64, 17945/69 and 15001/73, and U.S. Pat. Nos. 3,387,993 and 3,470,021.

Useful lubricants are silicone oils, graphite, molybdenum disulfide, tungsten disulfide, fatty acid esters of monocarboxylic fatty acids having 12 to 16 carbon atoms and monohydric alcohols having 3 to 12 carbon atoms, and fatty acid esters of monocarboxylic fatty acids having more than 17 carbon atoms and monohydric alcohols, in which the total number of carbon atoms in the ester is 15 to 28. 0.2 to 20 weight parts of such a lubricant are generally employed per 100 parts of the binder. These lubricants are described in Japanese Pat. Publication No. 23889/68, Japanese Pat. application Nos. 28647/67 and 81543/68, U.S. Pat. Nos. 2,654,681, 3,274,111, 3,276,946, 3,293,066, 3,398,011, 3,470,021, 3,492,235, 3,523,086, 3,625,760, 3,630,772, 3,634,253, 3,647,539, and 3,687,725, Canadian Pat. Nos. 535,575 and 728,591, British Pat. No. 793,520, and German Pat. No. (DT-AS) 1,221,282, etc.

Useful abrasives are fused alumina, silicon carbide, chromium oxide, corundum, synthetic corundum, diamond, synthetic diamond, garnet and emery (main components are corundum and magnetite). A suitable abrasive has a mean particle size of about 0.05 to 2 μm, preferably 0.1 to 2 μm. Generally about 0.5 to 20 weight parts of the abrasive particles are employed per 100 weight parts of the binder. These abrasives are described in Japanese Pat. Application No. (OPI) No. 115510/74, U.S. Pat. Nos. 3,007,807, 3,293,066, 3,630,910 and 3,687,725, British Pat. No. 1,145,349, and German Pat. No. (DT-PS) 853,211, etc.

Useful anti-static agents are inorganic materials such as carbon black; organic materials such as saponin or like natural surfactants, alkyleneoxides, glycerin, glycidol or like nonionic surfactants, higher alkylamines, quaternary ammonium salts, pyridiunium or like heterocyclic compounds, phosphonium, sulfonium or like cationic surfactants, carboxylic acids, sulfonic acids, phosphoric acids, anionic surfactants containing sulfuric acid ester groups, phosphoric acid aster groups or like acidic groups, aminoacids, aminosulfonic acids, sulfuric or phosphoric esters of aminoalcohols or like ampholytic surfactants. A suitable amount of the inorganic material is about 5% by weight and of the organic material is about 0.5 to 1% by weight, each based on the weight of the ferromagnetic material.

Some of the surfactant compounds used as the anti-static agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,793,891, 3,068,101, 3,158,484, 3,201,253, 3,210,191, 3,294,540, 3,415,649, 3,441,413, 3,442,654, 3,475,174, and 3,545,974, German Pat. Application (OLS) 1,942,665, British Pat. Nos. 1,007,317 and 1,198,450, R. Oda et al, *Synthesis of the Surface Active Agents and Their Applications*, Maki Shoten (1964), A. M. Schwartz et al., *Surface Active Agents*, Interscience Publications Inc., (1958), J. P. Sisley et al, *Encyclopedia of Surface Active Agents*, Vol. 2, Chemical Publishing Co., (1964), and *Surface*

*Active Agent Handbook*, 6th Edition, Sangyo Tosho K.K., (Dec. 20, 1966).

These surface active agents can be used individually or as mixtures. The surfactant is used not only for inhibiting the formation of static electricity but also for improving the dispersing, lubricating and coating properties and the magnetic properties of the resulting recording member.

The formation of the magnetic recording layer can be carried out by dispersing the iron oxide mixture in an organic solvent and applying the resulting composition on a support. A suitable coating thickness of the magnetic layer on the support ranges from about 0.5 to 20 $\mu$m, preferably 2 to 15 $\mu$m.

The non-magnetic support can have a thickness of about 2.5 to 100 $\mu$m, preferably 3 to 40 $\mu$m, for a tape, and suitable supports are polyethylene terephthalate, polyethylene naphthalate or like polyesters, polypropylene or like polylolefins, cellulose triacetate, cellulose diacetate or like cellulose derivatives, polyvinyl chloride or like vinyl resins, polycarbonate or like synthetic resins, aluminum, copper or other metals, glass or ceramics, etc.

Useful organic solvents for kneading the iron oxide particles and coating the resulting composition are acetone, methyl ethyl ketone, isobutyl ketone, cyclohexanone or like ketones, methanol, ethanol, propanol, butanol or like alcohols, methyl acetate, ethyl acetate, butyl acetate, ethyl lactate, glycol acetate monoethyl ether, or like esters, diethyl ether, glycol dimethyl ether, glycol monethyl ether, dioxane or like ethers, benzene, toluene, xylene or like aromatic hydrocarbons, methylene chloride, ethylene chloride, carbon tetrachloride, chloroform, ethylene chlorohydrin, dichlorobenzene or like chlorinated hydrocarbons, etc.

For coating the iron oxide containing mixture on a support, an air doctor coating method, a blade coating method, an air knife coating method, a squeeze coating method, a dip coating method, a reverse roll coating method, a transfer roll coating method, a kiss coating method, a cast coating method, and a spray coating method can be used. The details of these coating methods are described in *Coating Engineering*, pp. 253–277, Asakura Shoten Mar. 20, 1971).

The suitable amount of the above binder in the final coating formed is about 30 to 300 parts by weight, preferably 50 to 150 parts by weight, per 300 parts by weight of the ferromagnetic powder. When a megnetic recording medium is a tape, the thickness of the dry coating of the magnetic layer thus becomes about 0.5 to 10 microns.

The magnetic layer coated on the support by the above method is dried after, if desired, coated has been subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960, and 3,681,138; Japanese Pat. Publication Nos. 3427/1957, 28368/1964, 23624/1965, 23625/1965; 13181/1966, 13043/1973 and 39722/1973. If required, the magnetic layer can be subjected to a surface-smoothening treatment, or cut to the desired shape, thereby to form the magnetic recording material of this invention. Suitable surface-smoothening techniques are disclosed U.S. Pat. Nos. 2,688,567, 2,998,325, and 3,783,023, and German Pat. application (OPI) No. 2,405,222.

In the above orienting treatment for the magnetic layers, the orienting magnetic field can be either an AC or DC magnetic field with a field strength of about 500 to 2000 gauss. The drying temperature can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 Kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min. the operating efficiency is low, and if the rate is above about 120 meters/min, the operation is difficult.

The magnetic recording medium obtained in accordance with the present invention has a coercive force (Hc) of at least about 1000 Oe, and a saturation magnetization ($\sigma$) of at least about 2,500 Gauss.

The following Examples and Comparative Examples illustrate the present invention in greater detail. Those skilled in the art will readily understand that the components, proportions and operational sequences shown in these Examples can be changed or modified without departing from the spirit of the invention. Accordingly, the invention is not to be construed as being limited to these Examples. In the following Examples, all parts, percents, ratios and the like, are by weight unless otherwise indicated.

EXAMPLE 1

| | |
|---|---|
| $M_1$ Aqueous Solution | |
| Ferrous Chloride | 0.7 M/liter |
| Nickel Chloride | 0.3 M/liter |
| (HCl was added to adjust the pH of the solution to 1.0) | |
| $R_1$ Aqueous Solution | |
| Sodium Borohydride | 3.5 M/liter |
| (0.05 N NaOH aqueous solution) | |

80 parts of the $M_1$ Solution was mixed with 20 parts of the $R_1$ Solution in a DC magnetic field having an average field strength of about 600 Oe to perform an oxidation-reduction reaction. The reaction was completed in 3 minutes. The pH of the mixture at this time was 3.8. The resulting magnetic powder was washed with 1 liter of water, and then the water was replaced by 200 ml of acetone. A part of the product was dried in air, and the remainder was contacted with butyl acetate to replace the acetone. The resulting powder sample was designated P-1.

The reaction yield was about 70%. The temperature at the initiation of the reaction was 20° C.

A part of the powder sample was allowed to stand in an atmosphere held at 60° C and 90% RH for 10 days, and the saturation magnetization of the sample was measured.

A composition of the following formulation containing powder P-1 was placed in a ball mill to mix and disperse the ingredients thoroughly to prepare a magnetic coating composition.

|  | parts by weight |
|---|---|
| Ferromagnetic Powder (average particle diameter: 300 A) (P-1) | 300 |
| Polyester-Polyol (product of adipic acid and butylene glycol and having a hydroxyl number of 300) | 40 |
| Polyisocyanate (an adduct of tolylene diisocyanate and trimethylol propane) | 20 |
| Nitrocellulose | 20 |
| Aluminum Oxide ($Al_2O_3$: average particle diameter: 0.15 microns) | 5 |
| Lecithin | 3 |
| Methyl Ethyl Ketone | 450 |
| Methyl Isobutyl Ketone | 400 |

The resulting coating composition was coated on one surface of a 25 micron-thick polyethylene terephthalate film to a dry thickness of 5 microns while applying a magnetic field thereto, and then heat-dried. The resulting with magnetic web was slit to a width of ½ inch to produce a video tape. The tape obtained had very good surface characteristics. The resulting tape sample was designated T-1.

EXAMPLE 2

| $M_2$ Aqueous Solution | |
|---|---|
| Ferrous Chloride | 0.7 M/liter |
| Cobalt Chloride | 0.3 M/liter |
| (the pH of the solution was adjusted to 2.5 by adding hypophosphorous acid, 50% aqueous solution) | |
| $R_2$ Aqueous Solution | |
| Sodium Borohydride (in 0.01 N NaOH aqueous solution) | 3.5 M/liter |

80 parts of the $M_2$ Solution was mixed with 20 parts of the $R_2$ Solution in a DC magnetic field of an average field strength of about 600 Oe to perform an oxidation-reduction reaction. The reaction was completed in 3 minutes, and the pH of the reaction mixture at the end of the reaction was 4.3.

The mixture was treated in the same way as in Example 1 to form a ferromagnetic powder. This powder was designated P-2.

Using the resulting magnetic powder, a video tape was produced in the same manner as in Example 1. The tape sample was designated T-2.

Comparative Example 1

The same compositions of $M_1$ and $R_1$ Solutions as described in Example 1 were used, but HCl was not added to the $M_1$ Solution. Therefore, the pH adjustment of the M. Solution was not made. The pH of the solution was 3.9.

The same reaction as in Example 1 was conducted using the above described solution with the other conditions being the same as in Example 1. The pH of the reaction mixture at the end of the reaction was 6.8. The resulting powder sample was designated P-3.

Using the resulting powder, a video tape was produced in the same manner as in Example 1. The tape sample was designated T-3.

Comparative Example 2

The same procedures as in Example 1 were repeated except that the 0.05N sodium hydroxide solution was not added to the $R_1$ Solution, and water was added instead. The pH of the reaction mixture at the end of the reaction was 2.0, and with the lapse of time, the resulting magnetic powder dissolved. The powder sample obtained was designated P-4.

Using the resulting powder, a video tape was produced in the same manner as in Example 1. The resulting tape sample was designated T-4.

The reaction yield was 25%.

EXAMPLE 3

| $M_3$ Aqueous Solution | |
|---|---|
| Ferrous Chloride | 0.695 M/liter |
| Cobalt Chloride | 0.285 M/liter |
| Compound A (shown below) | 0.02 M/liter |
| (the pH was adjusted to 1.5 by adding HCl) | |
| $R_3$ Aqueous Solution | |
| Sodium Borohydride (0.01N NaOH aqueous solution) | 3.5 M/liter |

Compound A used in forming the $M_3$ Solution was each of $Ti[Ti(SO_4)_2]$, $Cr[K_2Cr_2(SO_4)_4 \cdot 2H_2O]$, $Ni[NiSO_4 \cdot 7H_2O]$, $Cu[CuSO_4 \cdot 5H_2O]$, $Zn[ZnSO_4 \cdot 7H_2O]$, $Al[Al_2(SO_4)_3 \cdot 18H_2O]$, $Pb[Pb(C_2H_3O_2 \cdot 2H_2O]$, and $P[NaH_2PO_2 \cdot H_2O]$.

Using these solutions, the same procedures as in Example 1 were repeated. The pH of each of the reaction mixtures at the end of the reaction is shown in Table 1.

Table 1

| Run No. | Element Added | pH of the $M_3$ Solution after reaction | Ferromagnetic Powder Sample | Tape Sample |
|---|---|---|---|---|
| 3-1 | Ti | 3.2 | P5-1 | T5-1 |
| 3-2 | Cr | 3.3 | P5-2 | T5-2 |
| 3-3 | Mn | 3.1 | P5-3 | T5-3 |
| 3-4 | Ni | 3.1 | P5-4 | T5-4 |
| 3-5 | Cu | 3.0 | P5-5 | T5-5 |
| 3-6 | Zn | 3.2 | P5-6 | T5-6 |
| 3-7 | Al | 3.2 | P5-7 | T5-7 |
| 3-8 | Pb | 3.3 | P5-8 | T5-8 |
| 3-9 | P | 3.2 | P5-9 | T5-9 |

The resulting ferromagnetic powders were designated samples P5-1 to P5-9, and the video tape produced using these samples were designated smaples T5-1 to T5-9, respectively.

Comparative Example 3

The procedures of Example 3 were repeated except that HCl was not added to the $M_3$ Solution. The resulting ferromagnetic powders obtained were desgnated samples P6-1 to P6-9, and the video tapes produced using these powders were designated as samples T6-1 to T6-9. The results obtained are shown in Table 2.

Table 2

| Sample No. | Element Added | pH of $M_3$ Comparative Solution | pH of $M_3$ Comparative Solution at End of the Reaction | Ferromagnetic Material No. | Tape No. |
|---|---|---|---|---|---|
| Comparison 3-1 | Ti | 3.5 | 5.4 | P6-1 | T6-1 |
| Comparison | | | | | |

Table 2-continued

| Sample No. | Element Added | pH of $M_3$ Comparative Solution | pH of $M_3$ Comparative Solution at End of the Reaction | Ferromagnetic Material No. | Tape No. |
|---|---|---|---|---|---|
| 3-2 Comparison | Cr | 4.0 | 5.9 | P6-2 | T6-2 |
| 3-3 Comparison | Mn | 3.6 | 5.5 | P6-3 | T6-3 |
| 3-4 Comparison | Ni | 3.7 | 5.6 | P6-4 | T6-4 |
| 3-5 Comparison | Cu | 3.5 | 5.5 | P6-5 | T6-5 |
| 3-6 Comparison | Zn | 3.6 | 5.5 | P6-6 | T6-6 |
| 3-7 Comparison | Al | 3.8 | 5.6 | P6-7 | T6-7 |
| 3-8 Comparison | Pb | 3.9 | 5.8 | P6-8 | T6-8 |
| 3-9 Comparison | P | 4.2 | 6.0 | P6-9 | T6-9 |

The properties of the powders and tapes produced in Examples 1 and 2 and Comparative Examples 1 and 2 were as shown in Tables 3 and 4 below.

Table 3

| Sample No. | Magnetic Field for Measurement (4000 Oe) | | Particle Diameter |
|---|---|---|---|
| | Saturation Magnetization | Saturation Magnetization after Standing for 10 Days at 60° C and 90% RH | |
| | (emu/g) | (emu/g) | (A) |
| P-1 | 95 | 70 | About 250 |
| P-2 | 100 | 75 | About 250 |
| P-3 | 98 | 75 | About 250 |
| P-4 | 70 | 50 | About 250 |

Table 4

| Sample No. | Hc | Br/Bm |
|---|---|---|
| | (Oe) | |
| T-1 | 2,100 | 0.85 |
| T-2 | 1,500 | 0.81 |
| T-3 | 1,000 | 0.80 |
| T-4 | 1,900 | 0.82 |

The above results demonstrate that samples P-1 and P-2 and T-1 and T-2 obtained in accordance with this invention have high Hc and Bm, and that since the particle size is fine, the magnetic powders obtained are suitable for high density recording. On the other hand, in the comparative samples P-3 and P-4 and T-3 and T-4, the Hc is in the vicinity of 1,000 Oe, and magnetic materials of high Hc cannot be obtained. When the pH of the reaction mixture at the end of the reaction was less than 3.0, a ferromagnetic powder having a high Hc could be obtained, but the reaction yield and Bm were low. Thus, the comparative samples were unsuitable as magnetic materials for high density recording.

The properties of the powders and tapes in Example 3 and Comparative Example 3 were as shown in Tables 5, 6, 7 and 8.

Table 5

| Sample No. | Magnetic field for Measurement (4000 Oe) | | Saturation Magnetization after Standing for 10 Days at 60° C and 90% RH |
|---|---|---|---|
| | Element Added | Saturation Magnetization | |
| | | (emu/g) | (emu/g) |
| P5-1 | Ti | 100 | 85 |
| P5-2 | Cr | 100 | 90 |
| P5-3 | Mn | 95 | 80 |
| P5-4 | Ni | 98 | 75 |
| P5-5 | Cu | 95 | 75 |
| P5-6 | Zn | 90 | 78 |
| P5-7 | Al | 90 | 78 |
| P5-8 | Pb | 100 | 85 |
| P5-9 | P | 100 | 85 |

Table 6

| Sample No. | Element Added | Hc | Br/Bm |
|---|---|---|---|
| | | (Oe) | |
| T5-1 | Ti | 1200 | 0.83 |
| T5-2 | Cr | 1300 | 0.82 |
| T5-3 | Mn | 1750 | 0.82 |
| T5-4 | Ni | 1800 | 0.80 |
| T5-5 | Cu | 1700 | 0.81 |
| T5-6 | Zn | 1500 | 0.82 |
| T5-7 | Al | 1350 | 0.80 |
| T5-8 | Pb | 1600 | 0.84 |
| T5-9 | P | 1500 | 0.83 |

Table 7

| Sample No. | Magnetic Field for Measurement (4000 Oe) | | Saturation Magnetization after Standing for 10 Days at 60° C and 90% RH |
|---|---|---|---|
| | Element Added | Saturation Magnetization | |
| | | (emu/g) | (emu/g) |
| P6-1 | Ti | 110 | 95 |
| P6-2 | Cr | 110 | 97 |
| P6-3 | Mn | 98 | 85 |
| P6-4 | Ni | 100 | 78 |
| P6-5 | Cu | 98 | 77 |
| P6-6 | Zn | 95 | 80 |
| P6-7 | Al | 94 | 80 |
| P6-8 | Pb | 108 | 92 |
| P6-9 | P | 105 | 90 |

Table 8

| Sample No. | Element Added | Hc | Br/Bm |
|---|---|---|---|
| | | (Oe) | |
| T6-1 | Ti | 800 | 0.83 |
| T6-2 | Cr | 850 | 0.82 |
| T6-3 | Mn | 980 | 0.82 |
| T6-4 | Ni | 980 | 0.80 |
| T6-5 | Cu | 1000 | 0.81 |
| T6-6 | Zn | 900 | 0.82 |
| T6-7 | Zl | 800 | 0.80 |
| T6-8 | Pb | 860 | 0.84 |
| T6-9 | P | 890 | 0.83 |

It is noted that in Comparative Example 3, the decrease in Bm due to moisture can be restrained by adding an element as indicated to the Fe-Co system, but that the coercive force decreases with any of the elements added. On the other hand, according to Example 3, ferromagnetic powders having a high Hc and a high Bm which is not reduced by moisture to a serious extent are obtained and these ferromagnetic powders would be usable as magnetic materials for high density recording.

EXAMPLE 4

$M_4$ Aqueous Solution

| | mol/liter |
|---|---|
| Ferrous Sulfate | 0.345 |
| Covalt Sulfate | 0.145 |
| Potassium Chromium Sulfate | 0.01 |

-continued

| R₄ Aqueous Solution | |
|---|---|
| Sodium Borohydride (0.01N NaOH aqueous solution) | 4 |

The pH of the M₄ Solution having the above composition was adjusted with sulfuric acid to prepare six samples having the pH values as shown in Table 9 below 80 parts of each sample of M₄ Solution was mixed with 20 parts of the R₄ Solution was mixed with 20 parts of an DC magnetic field of a field strength of about 1,000 oe to perform an oxidation-reduction reaction where the reaction temperature at the beginning of the reaction was adjusted to 25° C. The reaction was completed in 2 minutes. Table 9 shows the data obtained on each of the samples.

Table 9

| Sample No. | pH of M₄ Solution | pH of Solution at End of Reaction | Powder Sample | Tape Sample |
|---|---|---|---|---|
| A | 3.23 (no pH adjustment) | 7.05 | P-7A | T-7A |
| B | 2.56 | 6.40 | P-7B | T-7B |
| C | 1.82 | 5.64 | P-7C | T-7C |
| D | 1.04 | 4.90 | P-7D | T-7D |
| E | 0.61 | 3.05 | P-7E | T-7E |
| F | 0.40 | 1.48 | P-7F | T-7F |

The reaction mother liquor was removed, and thus obtained magnetic material was washed with water. 5 parts of the magnetic material cake after washing with water and filtering was added to 100 parts of a 0.25% by weight sodium oleate aqueous solution, and subsequently dispersed therein to absorb sodium oleate on the surface of the magnetic powder. Then, the magnetic powder was dried under a reduced pressure of 30 mmHg at 120° C. After cooling these samples nitrogen gas was introduced to increase the pressure to atmospheric pressure, the magnetic powder was placed, in n-butyl acetate. On analyzing the powder P-7A and P-7B, P-7A contained Fe: 56.9%, Co: 23.9%, Cr: 3.3% and B: 3.9%, each by weight, and P-7B contained Fe: 55.8%, Co: 23.7%, Cr: 3.2% and B: 3.8%, each by weight. The residue was water, hydroxides, oxides, fatty acid salts, etc. The surface of both powders P-7A and P-7B were completely hydrophobic. This is considered to be due to the adsorption of the surface active agent on the surface of the magnetic powder. A video tape was produced in the same manner as in Example 1. The characteristics of these magnetic powders are indicated in Tables 10 and 11.

Table 10

| Sample No. | Saturation Magnetization | Saturation Magnetization (σs) after Standing for 7 Days at 60° C and 90& RH | Particle Diameter | Yield |
|---|---|---|---|---|
| | (emu/g) | (emu/g) | A | (%) |
| P-7A | 120 | 105 | 350 | 98 |
| P-7B | 110 | 99 | " | 95 |
| P-7C | 115 | 100 | " | 90 |
| P-7D | 103 | 97 | 340 | 80 |
| P-7E | 100 | 91 | 330 | 65 |
| P-7F | 90 | 74 | 310 | 31 |

Table 11

| Sample No. | Hc | Br/Bm | Bm |
|---|---|---|---|
| | (Oe) | | (Gauss) |
| T-7A | 900 | 0.84 | 4000 |
| T-7B | 1030 | 0.86 | 4000 |
| T-7C | 1250 | 0.85 | 4000 |
| T-7D | 1400 | 0.86 | 3800 |
| T-7E | 1580 | 0.86 | 3500 |
| T-7F | 1720 | 0.86 | 2400 |

The surface of the magnetic powders having a high coercive force Hc obtained according to the present invention was treated with an anionic surface active agent with the result that the σs and the oxidation resistance thereof was improved. In forming the magnetic tape with the magnetic powder, the tape had a high Bm. This tape is suitable for a magnetic transfer master tape.

Comparative Example 3

1 part of powder P-7A dried in Example 4 was added to 0.1N of sulfuric acid at room temperature and dispersed for 1 minute. Subsequently, the treated P-7A was washed with water, then dried in the same manner as in Example 4. The thus obtained powders had an σs of 95 emu/g of 65 emu/g after standing for 7 days at 60° C and 30% RH, and a particle diameter of about 300 A. When the powder obtained here was employed to produce a tape, the tape had an Hc of 1,040 Oe, a Br/Bm of 0.79, and a Bm of 2,400 Gauss.

While the invention has been described in detail and with reference to specific embodiments thereof, it will be apparent to one skilled in the art that various changes and modifications can be made therein without departing from the spirit and scope thereof.

What is claimed is:

1. A process for preparing a ferromagnetic material which comprises mixing an aqueous solution containing at least a salt of Fe, Co, Fe-Co, Fe-Ni, Co-Ni and Fe-Co-Ni and whose pH has been adjusted to about 3.0 or less, with a solution of a reducing agent containing at least one boron hydride compound or a derivative thereof to perform an oxidation-reduction reaction, and adjusting the pH of the reaction mixture at the end of the reaction to at least about 3.0 or higher.

2. The process of claim 1, wherein the pH of said aqueous solution of the metal salt is adjusted with hydrochloric acid or sulfuric acid.

3. The process of claim 1, wherein said aqueous solution of the metal salt contains at least Fe, and at least one of the elements of Groups IVa, VIa, VIIa, VIII, Ib, IIb, IIIb, IVb, and Vb of the periodic table.

4. The process of claim 3, wherein the pH of said aqueous solution of the metal salt ranges from about 0.5 to 2.5.

5. The process of claim 1, wherein the concentration of the ferromagnetic metal ion in said aqueous solution of the metal salt is about 0.002 to 2 mole/liter.

6. The process of claim 5, wherein the concentration of the ferromagnetic metal ion in said aqueous solution of the metal salt is 0.01 to 0.5 mole/liter.

7. The process of claim 1, wherein the solution of the reducing agent contains an alkali metal hydroxide at a concentration of about 0.001 to 0.6N.

8. The process of claim 1, wherein the concentration of the boron hydride compound or the derivative thereof is about 0.0002 to 10 moles/liter.

9. The process of claim 1, wherein initially the oxdation-reduction reaction is at about 60° C or less.

10. The process of claim 9, wherein initially the oxdation-reduction reaction is performed at 40° C or less.

11. The process of claim 1, wherein the process further comprises treating the ferromagnetic material with an anionic surface active agent.

12. The process of claim 11, wherein the anionic surface active agent is a fatty acid containing 11 to 18 carbon atoms or a salt thereof.

13. The process of claim 12, wherein the anionic surface active agent is an alkali metal salt or alkaline earth metal salt of a saturated or unsaturated fatty acid.

14. A magnetic material comprising the ferromagnetic material produced by the process of claim 11, and having a coercive force of at least about 1,000 Oe.

15. A magnetic recording medium which comprises a support having thereon a dispersion comprising the ferromagnetic material prepared by the process of claim 1 and a binder.

16. A magnetic recording medium which comprises a support having thereon a dispersion comprising the ferromagnetic material prepared by the process of claim 11, and having a coercive force of at least about 1,000 Oe, a Bm of at least about 2,400 gauss, and Br/Bm of at least about 0.80.

* * * * *